United States Patent
Rockwell et al.

(10) Patent No.: US 6,834,146 B2
(45) Date of Patent: Dec. 21, 2004

(54) DIFFERENTIAL PHASE SHIFT KEYED DEMODULATOR SYSTEM

(75) Inventors: David A. Rockwell, Culver City, CA (US); David H. Matsuoka, Gardena, CA (US); Craig Leighton Schulz, Fremont, CA (US)

(73) Assignee: The Boeing Company, Chicago, IL (US)

( * ) Notice: Subject to any disclaimer, the term of this patent is extended or adjusted under 35 U.S.C. 154(b) by 331 days.

(21) Appl. No.: 10/038,152

(22) Filed: Jan. 3, 2002

(65) Prior Publication Data

US 2003/0123781 A1 Jul. 3, 2003

(51) Int. Cl.$^7$ ............... G02B 6/26; G02B 6/42; H04J 14/02
(52) U.S. Cl. ............... 385/42; 385/16; 385/31; 398/39; 398/82
(58) Field of Search ............... 385/16–21, 31, 385/39, 42; 398/39, 82

(56) References Cited

U.S. PATENT DOCUMENTS 6,487,331 B2 * 11/2002 Hung ............... 385/16

\* cited by examiner

*Primary Examiner*—Akm Enayet Ullah
*Assistant Examiner*—Jerry T. Rahll
(74) *Attorney, Agent, or Firm*—Artz & Artz, PC

(57) ABSTRACT

A differential phase shift keyed demodulator system uses a Michelson interferometer configuration in which polarization maintenance is accomplished by using a single 50:50 coupler coupled to a first Faraday rotator mirror and a second Faraday rotator mirror through a first fiber and a second fiber, respectively. In this way, system passively eliminates the polarization problem caused by using a Mach-Zehnder interferometer.

17 Claims, 1 Drawing Sheet

DIFFERENTIAL PHASE SHIFT KEYED DEMODULATOR SYSTEM

TECHNICAL FIELD

The present invention relates generally to communication systems, and more particularly, to a differential phase shift keyed demodulator system for communication systems.

BACKGROUND ART

Communication systems are in widespread use and take many forms. In general, the purpose of a communication system is to transmit information-bearing signals from a source, located at one point, to a user destination, located at another point some distance away. A communication system generally consists of three basic components: transmitter, channel, and receiver. The transmitter has the function of modulating the information signal into a form suitable for transmission over the channel. The function of the channel is to provide a physical connection between the transmitter output and the receiver input. The function of the receiver is to receive and then to demodulate the received signal so as to produce an estimate of the original information signal.

Analog and digital transmission methods are used to transmit an information signal over a communication channel. The use of digital methods offers several operational advantages over analog methods, including but not limited to: increased immunity to channel noise and interference, flexible operation of the system, common format for the transmission of different kinds of information signals, improved security of communication through the use of encryption, and increased capacity.

To transmit an information signal (either analog or digital) over a bandpass communication channel, the information signal must be manipulated into a form suitable for efficient transmission over the channel by modulating the information signal. Modulation involves varying some parameter of a carrier wave in accordance with the information signal in such a way that the spectrum of the modulated wave matches the assigned channel bandwidth. At the receiver point of the communication channel, a receiver re-creates the original information signal from a degraded version of the transmitted signal by a process known as demodulation.

A Mach-Zehnder interferometer (MZI) is commonly used in a differential phase shift keyed (DPSK) demodulator to convert the phase modulation of a signal into an amplitude modulation for subsequent detection. The principal technical challenge associated with this approach is maintaining a stable output from the MZI in the presence of thermal and acoustic perturbations. Specifically, in order for the MZI to function properly, the two optical signals that interfere at the MZI output must be co-polarized (as they were at the entry to the MZI), and their only phase difference must be due to the DPSK phase change. The environmental factors mentioned above can affect both the polarization and phase of the signals, thereby distorting the MZI output that is detected.

The disadvantages associated with this conventional DPSK demodulation technique have made it apparent that a new technique for DPSK demodulation is needed. The new technique should eliminate the polarization problem in prior art DPSK demodulation systems caused by thermal and acoustic perturbations. Additionally, the new technique should reduce assembly complexity allowing lower cost and greater reliability. The present invention is directed to these ends.

SUMMARY OF THE INVENTION

It is, therefore, an object of the invention to provide an improved and reliable differential phase shift keyed demodulator system. Another object of the invention is to eliminate the polarization problem in prior art DPSK demodulation systems caused by thermal and acoustic perturbations.

In accordance with the objects of this invention, a differential phase shift keyed demodulator system is provided. In one embodiment of the invention, a differential phase shift keyed demodulator system 18 uses a Michelson interferometer configuration in which polarization maintenance is accomplished by using a single 50:50 coupler 28 coupled to a first Faraday rotator mirror 30 and a second Faraday rotator mirror 32 through a first fiber 34 and a second fiber 36, respectively. In this way, system 18 passively eliminates the polarization problem associated with using a Mach-Zehnder interferometer.

The present invention thus achieves an improved differential phase shift keyed demodulator system. The present invention is advantageous in that it reduces assembly complexity, thereby allowing lower cost and greater reliability.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODES FOR CARRYING OUT THE INVENTION

Figure 1:
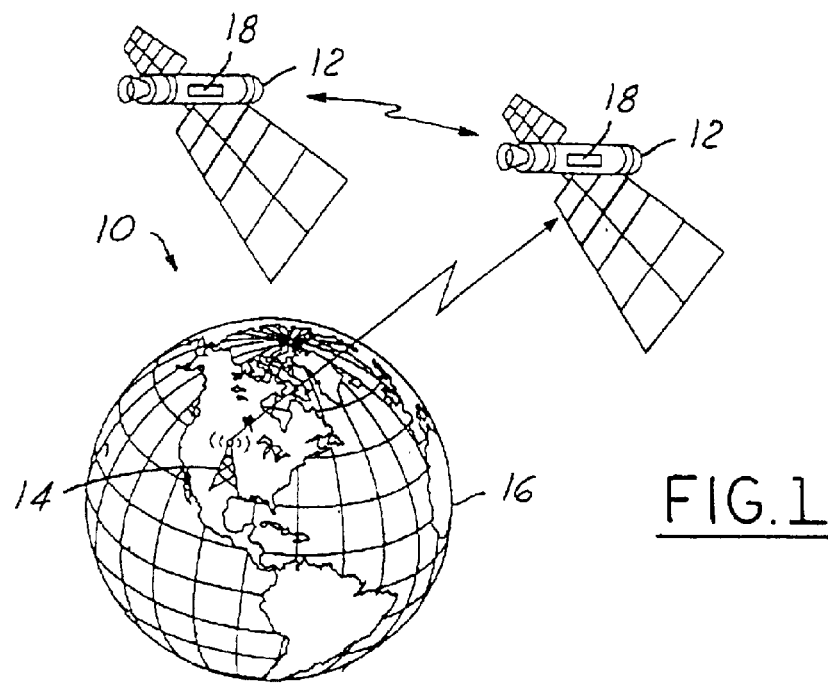
FIG. 1 is a perspective view of a satellite differential phase shift keyed demodulator system in accordance with one embodiment of the present invention.

In the following Figures, the same reference numerals will be used to identify identical components in the various views. The present invention is illustrated with respect to a differential phase shift keyed demodulator system, particularly suited for the aerospace field. However, the present invention is applicable to various other uses that may require differential phase shift keyed demodulator systems or wavelength division multiplexers or de-multiplexers.

Referring to FIG. 1, a perspective view of an optical intersatellite communication system 10 in accordance with one embodiment of the present invention is illustrated. The optical intersatellite communication system is comprised of two or more satellites 12 in communication with each other. Satellites 12 rely upon optical communications to send and receive data that either is to be utilized onboard that same satellite (examples include attitude and position information, diagnostic status checks, and other functions), or is to be retransmitted to another satellite 12. Without accurate and reliable optical communications, the satellite mission is hindered and at times adversely affected. Each satellite 12 contains one or more differential phase shift keyed demodulator systems 18 to demodulate communication signals.

In an alternative embodiment, a ground station 14 is in communication with satellite 12 and may include one or more differential phase shift keyed demodulator systems 18 to demodulate communication signals. One skilled in the art would realize that ground station 14 to satellite 12 communication would require additional power and would need to compensate for atmospheric turbulence and attenuation. However, one skilled in the art would realize that the present invention is suited for not only inter-satellite communication, but also Earth to satellite communication.

Figure 2:
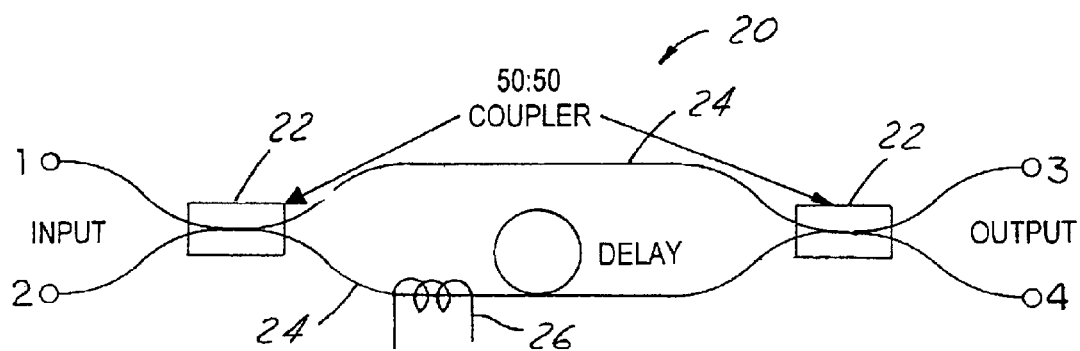
FIG. 2 is a block diagram of a prior art differential phase shift keyed demodulator system.

Referring to FIG. 2, a block diagram of a prior art differential phase shift keyed demodulator system 20 is illustrated. A fiber-based Mach-Zehnder interferometer (MZI) is schematically shown in FIG. 2. It comprises two 50:50 couplers 22 joined by two parallel fiber arms 24 having a predetermined length difference (delay). As is well known in the existing art, depending on the properties of the input beam(s) launched into ports 1 and/or 2 and the fiber length difference, the MZI can function either as a wavelength-division multiplexer (WDM) or demultiplexer, or as a demodulator. In any case, the desired performance requires that the optical path length difference (delay) between the two fiber arms 24 be controlled to a fraction of an optical wavelength. In addition any depolarization that arises in one interferometer arm must be identical to that in the other arm to ensure the two beams interfere properly at the second 50:50 coupler to produce the desired outputs at ports 3 and 4.

In existing applications, the temperature control is accomplished by exploiting the fact that the optical length of a fiber depends on temperature via the thermal expansion coefficient and the temperature dependence of the refractive index. In particular, a heater wire 26 is wrapped around one of the fibers 24 and then the MZI output is monitored as a feedback signal to a standard thermal controller to determine the level of heating/cooling required to maintain the desired path-length difference.

The depolarization mechanisms are often thermally driven, so the temperature controller will help minimize any depolarization. However, other perturbations can also affect the polarization, specifically acoustic vibrations that can slightly alter the local stresses in a fiber 24 and, hence, the polarization state of an optical beam passing through the fiber 24. This effect is more difficult to control, but approaches have been developed that to compensate for this problem. However, these prior art approaches often involve tedious procedures, and the resulting performance just meets established requirements. Moreover, the extinction ratio (defined as the purity of the final interference at the output coupler) depends on which output port is used, varying by a nontrivial amount; this variation can be problematic in system applications, since signal processing requires the outputs of both ports be substantially the same.

The use of a Faraday rotator to compensate for depolarization is well known in the art. In the prior art, when two "identical" depolarizers are placed in series, and one places a Faraday rotator between them that rotates the polarization state of the beam leaving the first depolarizer by 90 degrees prior to entering the second depolarizer, the second depolarizer exactly compensates the depolarization imposed by the first depolarizer. The challenge in implementing this technique is often the ability to find two "identical" depolarizers.

One way to provide two identical depolarizers is to use the combination of a 45-degree Faraday rotator followed by a highly reflecting mirror to double-pass-any depolarizer. In this case the first- and second-pass depolarizers are, in fact, identical. The Faraday rotator-mirror combination has the property that the two 45-degree rotations from each pass through the Faraday rotator add, providing the required total of 90 degrees.

The depolarization can be quantified by specifying a phase difference between two orthogonal polarization components, denoted as "vertical" and "horizontal." In general, these two components experience different stresses along their respective paths (stress is a tensor property so the impact depends highly on the orientation of the polarization vector relative to the direction of applied stress). The impact of the 90-degree polarization rotation imposed by the Faraday rotator is to exchange the identities of the two polarization components, such the horizontal becomes vertical and the vertical becomes horizontal. Now, during the second pass through the depolarizing medium, each component experiences the identical environment that the other component experienced on the first pass. This means that after two complete passes, the two components have no phase difference, thereby restoring the initial degree of polarization.

Figure 3:
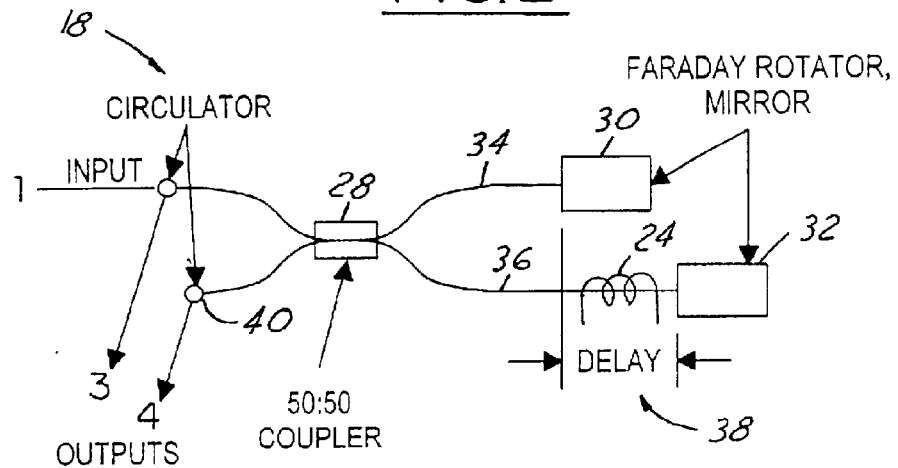
FIG. 3 is a block diagram of a differential phase shift keyed demodulator system in accordance with one embodiment of the present invention.

Referring to FIG. 3, a differential phase shift keyed demodulator system 18 in accordance with one embodiment of the present invention is illustrated. Differential phase shift keyed demodulator system 18 uses a fiber-based Michelson interferometer structure in which polarization maintenance is accomplished by using a single 50:50 coupler 22 coupled to a first fiber 34 and a second fiber 36, which are coupled to a first Faraday rotator mirror 30 and a second Faraday rotator mirror 32, respectively. The 50:50 coupler 22 is also coupled to a first circulator 39 and second circulator 40.

This invention is a much more practical approach to achieving the required polarization stability than the prior art, which can yield good polarization maintenance at room temperature, but is tedious and offers no guarantee that such maintenance can be sustained throughout a mission life involving both thermal and acoustic perturbations. Moreover, since the polarization state is a sensitive function of localized stresses in the fibers, the effectiveness of the prior art can change if the fibers are flexed somewhat as the device is packaged for flight.

The advantages of this invention arise from the fact that it is fundamentally a passive technique for polarization maintenance, provided one simply maintains the Faraday rotator at an approximately constant temperature with a very loose tolerance of $\rho$ 15° C. This level of temperature stability can be achieved in hardware implementations using simple open-loop control. When this required loose temperature control is maintained, the approach can maintain excellent demodulation performance over a wide temperature range. Specifically, the present invention achieves an extinction ratio (i.e. quality of the demodulation) that exceeds system requirements by at least 5 dB, while the prior art yields a very small margin of only 1 dB. Finally, an advantage of the present invention is ease of assembly, which ultimately translates into lower cost and greater reliability.

The fiber-length difference 38 between the two fiber components of the Michelson interferometer of FIG. 3 is half as much as for the Mach-Zehnder interferometer of FIG. 2, since the beams in a Michelson interferometer double pass the fibers 34, 36. The interferometer outputs both exit at the same end of the interferometer as they entered. Output 3

(analogous to output port 3 in FIG. 2) is split off the input channel using a standard optical circulator 39, while output 4 (analogous to output port 4 in FIG. 2) exits through the remaining port of the first 50:50 coupler. An equalizing circulator 40 is applied to output 4 to ensure the two outputs have equal propagation losses through the output ports.

Referring to FIG. 3, one possible implementation of the present invention comprises using a standard optical fiber (Corning SMF28), a standard coupler, and commercial Faraday-rotator-mirrors and optical circulators. This Michelson interferometer implementation yields an extinction ratio that exceeds prior art requirements by 5 dB or more, with the same extinction ratio being produced at both output ports. Through practical experience, it has also been determined that the Michelson implementation is significantly easier to assemble than the Mach-Zehnder implementation. In system applications, this feature leads to cost savings as well as less performance variability.

While testing the Michelson interferometer to temperatures over the temperature range of 0 to 60° C. the only impact of the temperature changes was to change the Verdet constant of the Faraday rotator material. The Verdet constant indicates for a given material how many degrees of polarization rotation are imposed on a beam per unit path length through the material. In order to ensure a single pass through the Faraday rotator always produces a 45-degree polarization rotation, the temperature must be stabilized to a tolerance of ±15 C. This can be achieved in hardware implementations using simple open-loop control, which is easily implemented given that Faraday rotators dissipate essentially no heat (there is no intrinsic absorption of the optical beams).

The present invention thus achieves an improved and reliable differential phase shift keyed demodulator system by using a Michelson interferometer instead of a Mach-Zehnder interferometer. The present invention eliminates the polarization problem in prior art DPSK demodulation systems caused by thermal and acoustic perturbations. Additionally, the present invention reduces assembly complexity allowing lower cost and greater reliability.

From the foregoing, it can be seen that there has been brought to the art a new and improved differential phase shift keyed demodulator system that may also be used for wavelength division multiplexing or de-multiplexing. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. A method for processing an optical communications signal, the method utilized as a DPSK demodulator and comprising the steps of:
   coupling at least one first-optical signal into a primary-first-optical circulator input of a first-optical circulator;
   splicing a primary-first-optical-circulator output port to a first 50:50 coupler input port of a 50:50 coupler;
   employing a secondary-first-optical circulator output port of said first optical circulator as a first-optical fiber output port of said 50:50 coupler;
   splicing a primary-second-optical circulator output port to a second 50:50 coupler input port of said 50:50 coupler;
   employing a secondary-second-optical circulator output port as a second-optical fiber output port;
   splicing a first 50:50 coupler output port to a first optical fiber, having a first optical fiber length, which is terminated with a first reflector that returns any optical signals back toward said 50:50 coupler;
   splicing a second 50:50 coupler output port to a second optical fiber, having a second length, which is terminated with a second reflector that returns any optical signals back toward said 50:50 coupler, said first and second reflectors having substantially the same reflection properties;
   interfering reflected signals from said first and second reflectors as they pass back through said 50:50 coupler;
   allowing interference products of said reflected signals to propagate back toward said first and second optical circulators, which direct said interference products to said first and second optical fiber output ports; and
   controlling said first and second fiber lengths and the properties of said reflectors so as to accomplish the desired optical processing in a manner that is resistant to varying environmental influences.

2. The method for processing an optical communications signal as recited in claim 1, further comprising the steps of:
   coupling at least one second optical signal into a primary-second-optical circulator input of said second optical circulator, wherein said first and second optical circulators have substantially the same propagation characteristics.

3. The method for processing an optical communications signal as recited in claim 2, wherein the step of controlling said first and second fiber lengths comprises using a heating element to tune said fiber lengths.

4. The method for processing an optical communications signal as recited in claim 2, utilized as a wavelength division multiplexer I demultiplexer.

5. The method for processing an optical communications signal as recited in claim 2, wherein said reflectors are Faraday rotator-mirrors.

6. The method for processing an optical communications signal as recited in claim 1, wherein the step of controlling said first and second fiber lengths comprises using a heating element to tune said fiber lengths.

7. The method for processing an optical communications signal as recited in claim 1, wherein said step of allowing comprises allowing
   interference products of said reflected signals to propagate back toward said first and second optical circulators, which direct said interference products to said first and second optical-fiber outputs.

8. The method for processing an optical communications signal as recited in claim 1, wherein said reflectors are Faraday rotator-mirrors.

9. The method for processing an optical communications signal as recited in claim 1, utilized as an optical switch.

10. An apparatus for processing an optical communications signal comprising:
   a first optical circulator having a primary-first-optical circulator input, a primary-first-optical circulator output, and a secondary-first-optical circulator output, said primary-first-optical circulator input receiving at least one first optical signal, said secondary-first-optical circulator output port spliced to a first-optical fiber output port;
   a second optical circulator having a primary-second-optical circulator input, a primary-second-optical circulator output, and a secondary-second-optical circulator output, said secondary-second-optical circulator output port spliced to a second-optical fiber output port;

a 50:50 coupler having a first 50:50 coupler input port, a second 50:50 coupler input port, a first 50:50 coupler output port, and a second 50:50 coupler output port, said first 50:50 coupler input port spliced to said primary-first-optical circulator output, and said second 50:50 coupler input port spliced to said primary-second optical circulator output;

a first optical fiber, having a first optical fiber length coupled to said first 50:50 coupler output port;

a first reflector terminating said first optical fiber and returning any optical signals back toward said 50:50 coupler;

a second optical fiber, having a second optical fiber length coupled to said second 50:50 coupler output port;

a second reflector terminating said second optical fiber and returning any optical signals back toward said 50:50 coupler, said first and second reflectors having substantially the same reflection properties;

wherein said 50:50 coupler interferes reflected signals from said first and second reflectors as they pass back through said 50:50 coupler, thereby allowing interference products of said reflected signals to propagate back toward said first and second optical circulators, which direct said interference products to said first and second optical fiber output ports; and a mechanism comprising a heating element and coupled to said second optical fiber, said mechanism controlling said second fiber length so as to accomplish the desired optical processing in a manner that is resistant to varying environmental influences.

11. The apparatus for processing an optical communications signal as recited in claim 10, utilized as an optical switch.

12. The apparatus for processing an optical communications signal as recited in claim 10, wherein said second optical circulator includes a primary-second-optical circulator input, said primary-second-optical circulator input receiving at least one second optical signal.

13. The apparatus for processing an optical communications signal as recited in claim 12, utilized as a wavelength division multiplexer/demultiplexer.

14. The apparatus for processing and optical communications signal as recited in claim 12, wherein said reflectors are Faraday rotator-mirrors.

15. The apparatus for processing an optical communications signal as recited in claim 12, wherein said mechanism comprises a heating element.

16. The apparatus for processing an optical communications signal as recited in claim 10, wherein said reflectors are Faraday rotator-mirrors.

17. The apparatus for processing an optical communications signal as recited in claim 10, utilized as a DPSK demodulator.

* * * * *